(12) United States Patent
Gunnarsson et al.

(10) Patent No.: US 9,693,262 B2
(45) Date of Patent: Jun. 27, 2017

(54) LOAD SHARING IN CELLULAR NETWORKS

(71) Applicant: Telefonaktiebolaget L M Ericsson (publ), Stockholm (SE)

(72) Inventors: Fredrik Gunnarsson, Linköping (SE); Andreas Bergström, Vikingstad (SE); Jonas Fröberg Olsson, Ljungsbro (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/896,688

(22) PCT Filed: Jun. 13, 2013

(86) PCT No.: PCT/EP2013/062251
§ 371 (c)(1),
(2) Date: Dec. 8, 2015

(87) PCT Pub. No.: WO2014/198317
PCT Pub. Date: Dec. 18, 2014

(65) Prior Publication Data
US 2016/0150441 A1     May 26, 2016

(51) Int. Cl.
*H04W 72/00*        (2009.01)
*H04W 28/08*        (2009.01)
(Continued)

(52) U.S. Cl.
CPC .......... *H04W 28/08* (2013.01); *H04W 24/02* (2013.01); *H04W 24/10* (2013.01); *H04W 36/22* (2013.01); *H04W 84/042* (2013.01)

(58) Field of Classification Search
USPC .... 455/432.1, 435.3, 436–453, 456.1–456.3; 370/329–334
See application file for complete search history.

(56) References Cited

U.S. PATENT DOCUMENTS

| | | | | |
|---|---|---|---|---|
| 5,103,445 | A | * | 4/1992 | Ostlund .............. H04W 28/02 370/329 |
| 2004/0219912 | A1 | * | 11/2004 | Johansson ............ H04W 24/02 455/424 |

(Continued)

FOREIGN PATENT DOCUMENTS

EP     2498540 A1     9/2012

OTHER PUBLICATIONS

LV, W., et al., "Distributed Mobility Load Balancing With RRM in LTE", 3rd IEEE International Conference on Broadband Network and Multimedia Technology (IC-BNMT), Oct. 26, 2010, pp. 457-461, IEEE.

(Continued)

*Primary Examiner* — Dai A Phuong
(74) *Attorney, Agent, or Firm* — Patent Portfolio Builders, PLLC

(57) ABSTRACT

There is provided load sharing performed by a first processing unit device and a second processing unit device. The load sharing is achieved by the first processing unit device determining a distinct subset of user equipment, UE, from a set of UEs, where the UEs of the distinct subset of UEs are candidates for load sharing. Information identifying the UEs in the distinct subset and information of load of a first cell in which the distinct subset of UEs are served and information of load of a second cell being a candidate cell for serving the distinct subset of UEs is transmitted to the second processing unit device. Based on evaluating the information received from the first processing unit device the second processing unit device determines a load sharing action for use by the first processing unit device.

24 Claims, 6 Drawing Sheets

(51) Int. Cl.
*H04W 24/02* (2009.01)
*H04W 36/22* (2009.01)
*H04W 24/10* (2009.01)
*H04W 84/04* (2009.01)

(56) References Cited

U.S. PATENT DOCUMENTS

| | | | | |
|---|---|---|---|---|
| 2004/0229621 | A1* | 11/2004 | Misra | H04W 16/08 |
| | | | | 455/445 |
| 2007/0177552 | A1* | 8/2007 | Wu | H04W 88/08 |
| | | | | 370/335 |
| 2012/0185429 | A1* | 7/2012 | Shu | H04W 24/08 |
| | | | | 707/609 |
| 2013/0084864 | A1 | 4/2013 | Agrawal et al. | |
| 2014/0098670 | A1* | 4/2014 | Choi | H04L 5/00 |
| | | | | 370/235 |
| 2015/0181481 | A1* | 6/2015 | Masini | H04W 36/0083 |
| | | | | 455/436 |
| 2015/0201335 | A1* | 7/2015 | De Pasquale | H04B 7/022 |
| | | | | 370/329 |
| 2016/0135102 | A1* | 5/2016 | Gunnarsson | H04W 24/02 |
| | | | | 455/437 |
| 2016/0150452 | A1* | 5/2016 | Kitaji | H04W 36/08 |
| | | | | 370/315 |
| 2016/0198365 | A1* | 7/2016 | Rajagopalan | H04W 36/22 |
| | | | | 455/453 |

OTHER PUBLICATIONS

3rd Generation Partership Project, "3rd Generation Partnership Project; Technical Specification Group Radio Access Network; Evolved Universal Terrestrial Radio Access (E-UTRA); Radio Resource Control (RRC); Protocol specification (Release 10)", Technical Specification, 3GPP TS 36.331 V10.1.0, Mar. 1, 2011, pp. 1-290, 3GPP, France.

3rd Generation Partership Project, "3rd Generation Partnership Project; Technical Specification Group Radio Access Network; Evolved Universal Terrestrial Radio Access Network (E-UTRAN); X2 application protocol (X2AP) (Release 10)", Technical Specification, 3GPP TS 36.423 V10.1.0, Mar. 1, 2011, pp. 1-132, 3GPP, France.

* cited by examiner

LOAD SHARING IN CELLULAR NETWORKS

TECHNICAL FIELD

Embodiments presented herein relate to cellular networks, and particularly to methods, network nodes and a computer programs for load sharing in cellular networks.

BACKGROUND

In cellular networks, there is always a challenge to obtain good performance and capacity for a given communications protocol, its parameters and the physical environment in which the cellular network is deployed.

In a cellular network where users in a cell are served by network nodes there may be areas with high traffic, i.e. high concentration of users. By a user is here meant a wireless user device, such as a user equipment, UE. In such areas it is desirable to deploy additional capacity to ensure user satisfaction. The added capacity may be in the form of additional macro network nodes or network nodes with lower output power, such as micro network nodes or pico network nodes covering a particular area, thus concentrating the capacity boost to the particular area.

In the cellular network there may also be particular areas with coverage below a predetermined quality criterion where there thus may be a need for coverage extension. One way to mitigate this problem is to deploy a network node with low output power to concentrate the coverage boost to the particular areas. In general terms, a network node in the form of a so-called macro base station provides a wide area coverage (also called a macro cell). In the coverage area of the macro base station also low power network nodes may be deployed to provide small area capacity/coverage. Examples of such low power network nodes are so-called pico base stations, relays and home base stations (femto cells).

One argument for choosing network nodes with lower output power in the above scenarios is that the impact on the network as a whole may be minimized, e.g. for example concentrating any potential added interference of the network to the particular areas in which the additional network nodes with lower output power are deployed.

Additionally, there is currently a common drive in the direction towards the use of low power network nodes. The different terms used for these types of network deployments are Heterogeneous networks, multilayer networks or shortly HetNets.

Since cells generally are operated with different pilot power levels, there may be imbalances between uplink and downlink in the network. One reason is that cells to serve the UE are typically by the network nodes selected based on received signal strength. This implies that a UE is served by the best downlink cell alternative (according to some quality of service or throughput criterion). However, the uplink channel quality depends mainly on the distance between the UE and the serving network node, thus being independent of the pilot power. This means that for cell selection based on downlink pilot signaling, a UE may have a better (according to some quality of service or throughput criterion) uplink to a non-serving network node. In such case a different solution called Cell Range Extension (CRE) may be used. In general terms, CRE may be regarded as a cell relation specific offset that the UE considers in the report triggering condition evaluations. One effect is that small cells are expanded into a CRE area, where the downlink from the macro base station is more favourable than the downlink from the pico base station.

Once such cells are detected by the UE and reported to the macro base station, the macro base station may decide to handover the UE to the detected pico base station. Such handover might be preceded by allocation of so-called Almost Blank Subframes (ABS) by the the macro base station (see the 3GPP standardization documents TS 36.331 and TS 36.423). ABSs are so-called "protected subframes". In such subframes the macro base station limits its transmission. Therefore, a small cell neighbouring the macro base station will experience reduced interference during transmission of ABS subframes.

Once the UE is handed over to the CRE of the small cell, the thus serving pico base station may decide to serve the UE during ABSs, due to the otherwise high downlink interference the UE would experience from the macro base station. Further, the UE should be configured by the pico base station so as to measure neighbouring cells on ABSs. This may ensure that the measurements are not impacted by high levels of downlink interference from the macro base station.

Advanced load sharing mechanisms, such as the process summarized above, may be beneficial to avoid overload in cells by distributing load between frequencies, radio access technologies and radio network nodes. However, implementing such advanced load sharing may require more computational capacity and more and measurement reporting capacity than is available in radio access control circuitries in current network nodes. Moreover, such advanced mechanisms are challenging to effectively combine with further coordinated resource management.

Hence, there is still a need for an improved load sharing in cellular networks.

SUMMARY

An object of embodiments herein is to provide improved load sharing in cellular networks.

The inventors of the enclosed embodiments have realized that at least some of the problems associated with the above disclosed advanced load sharing mechanisms may be resolved, or at least mitigated by distributing the load sharing action determination.

A particular object is therefore to provide improved load sharing in cellular networks by distributing the load sharing action determination.

According to a first aspect there is presented a method for load sharing. The method is performed by a first processing unit device. The method comprises determining a distinct subset of user equipment, UE, from a set of UEs, the distinct subset of UEs being candidates for load sharing. The method comprises transmitting information identifying the UEs in the distinct subset and information of load of a first cell in which the distinct subset of UEs are served and information of load of a second cell being a candidate cell for serving the distinct subset of UEs to a second processing unit device. The method comprises receiving a load sharing action from the second processing unit device, the load sharing action being based on evaluation of the information transmitted by the first processing unit device. The method comprises performing the load sharing action.

According to a second aspect there is presented a method for load sharing. The method is performed by a second processing unit device. The method comprises receiving information identifying user equipment, UEs, in a distinct subset from a set of UEs, the distinct subset of UEs being candidates for load sharing, and information of load of a first cell in which the distinct subset of UEs are served and information of load of a second cell being a candidate cell for serving the distinct subset of UEs from a first processing unit device. The method comprises determining a load sharing action based on evaluating the information received from the first processing unit device. The method comprises transmitting the determined load sharing action to the first processing unit device.

Advantageously, by distributing the load sharing action determination from a first to a second processing unit device it is possible to consider more advanced load sharing mechanisms that involve calculations that the first processing unit device would have difficulty to perform. Furthermore, since the load sharing actions may be jointly determined with secondary cell activation/deactivation and scheduling, MIMO scheduling and activation/deactivation of different antenna points for joint transmission, reception, scheduling, this will improve the efficiency of the load sharing. The load sharing strategy will lead to proposed changes of serving cells for at least one UE, and/or at least one bearer. The load sharing strategy and algorithm may thus be seen as producing load sharing actions in the form of changes in the serving cells.

According to a third aspect there is presented a first processing unit device for load sharing. The first processing unit device comprises a processing unit arranged to determine a distinct subset of user equipment, UE, from a set of UEs, the distinct subset of UEs being candidates for load sharing. The first processing unit device comprises an input/output (I/O) interface arranged to transmit information identifying the UEs in the distinct subset and information of load of a first cell in which the distinct subset of UEs are served and information of load of a second cell being a candidate cell for serving the distinct subset of UEs to a second processing unit device. The I/O interface is arranged to receive a load sharing action from the second processing unit device, the load sharing action being based on evaluation of the information transmitted by the first processing unit device. The processing unit is arranged to perform the load sharing action According to a fourth aspect there is presented a second processing unit device for load sharing. The second processing unit device comprises an input/output (I/O) interface arranged to receive information identifying user equipment, UEs, in a distinct subset from a set of UEs, the distinct subset of UEs being candidates for load sharing, and information of load of a first cell in which the distinct subset of UEs are served and information of load of a second cell being a candidate cell for serving the distinct subset of UEs from a first processing unit device. The second processing unit device comprises a processing unit arranged to determine a load sharing action based on evaluating the information received from the first processing unit device. The I/O interface is arranged to transmit the determined load sharing action to the first processing unit device.

According to a fifth aspect there is presented a computer program for load sharing, the computer program comprising computer program code which, when run on a first processing unit device, causes the first processing unit device to perform a method according to the first aspect.

According to a sixth aspect there is presented a computer program for load sharing, the computer program comprising computer program code which, when run on a second processing unit device, causes the second processing unit device to perform a method according to the second aspect.

According to a seventh aspect there is presented a computer program product comprising a computer program according to at least one of the fifth aspect and the sixth aspect and a computer readable means on which the computer program is stored. The computer readable means may be non-volatile computer readable means.

It is to be noted that any feature of the first, second, third, fourth, fifth, sixth, and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
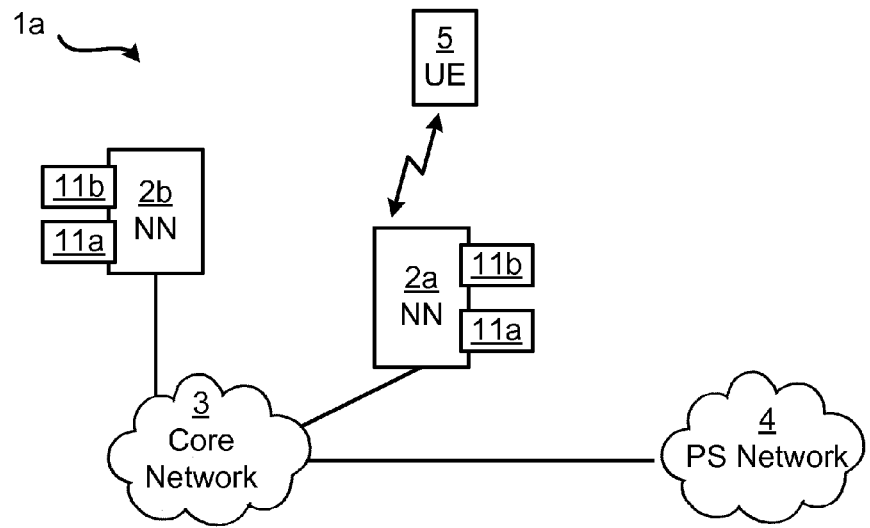
FIGS. 1, 2, and 3 are schematic diagrams illustrating wireless communications systems where embodiments presented herein may be applied.

FIG. 1 shows a schematic overview of an exemplifying wireless communication system 1. The wireless communication system 1 comprises network nodes 2a, 2b providing network coverage over cells (not shown). Each cell is served by at least one of the network nodes 2a-b. A user equipment (UE) 5, positioned in a particular cell is thus provided network service by the network node 2a-b serving that particular cell. Further, the network nodes 2a-b are arranged to communicate with other network nodes 2a-b via communications links. The network nodes 2a-b are also operatively connected to a core network 3. The core network 3 may provide services and data to the UE 5 operatively connected to at least one of the network nodes 2a-b from an external packet switched data network 4. As the skilled person understands, the wireless communications system 1a may comprise a plurality of network nodes 2a-b and a plurality of UEs 5 operatively connected to at least one of the plurality of network nodes 2a-b. Each network node comprises a first processing unit device 11a and a second processing unit device 11b, the functionalities of which will be further disclosed below. The communications system 1a may generally comply with any one or a combination of W-CDMA (Wideband Code Division Multiplex), LTE (Long Term Evolution), EDGE (Enhanced Data Rates for GSM Evolution, Enhanced GPRS (General Packet Radio Service)), CDMA2000 (Code Division Multiple Access 2000), WiFi, microwave radio links, etc., as long as the principles described hereinafter are applicable.

In general terms, a cell may be associated with one or more of an operational carrier, a radio access technology, an antenna system, a transmission power, a pilot or reference signal, etc. A cell can also refer to the coverage area of a network node or antenna point, or the joint coverage area of multiple network nodes of antenna points. The cell can also be in operation to serve all, or only a subset of the UEs, in a coverage area of a network node. In the examples herein, all cells are associated with the same operational carrier and LTE as radio access technology. However, as the skilled person understands the herein presented inventive concept is equally applicable if the cells are differently configured.

Figure 2:
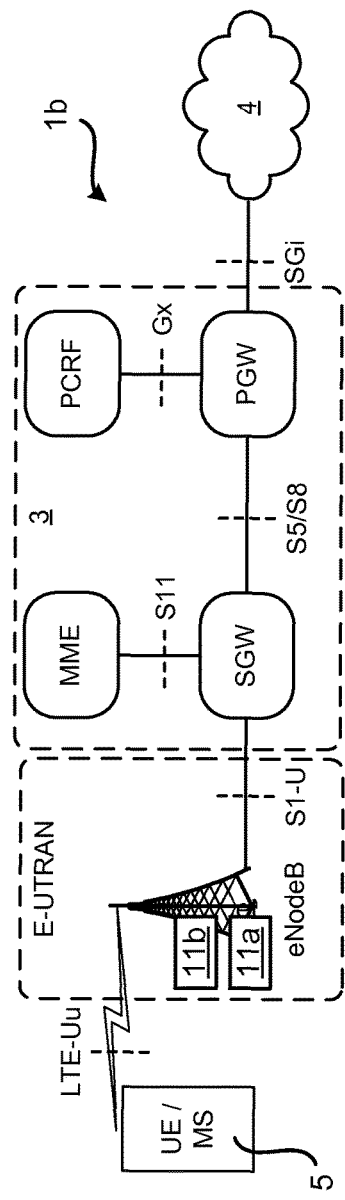

FIG. 2 shows a schematic illustration of an exemplifying LTE architecture. As may be seen, the wireless communication system 1b comprises a network node in the form of an eNodeB, operatively connected to a Serving Gateway (SGW), in turn operatively connected to a Mobility Management Entity (MME) and a PDN Gateway (PGW), which in turn is operatively connected to a Policy and Charging Rules Function (PCRF). The eNodeB is a radio access node that interfaces with a radio terminal, which is denoted User Equipment (UE) in LTE. The eNodeBs of the system forms the radio access network E-UTRAN for LTE. The eNodeBs comprises a first processing unit device 11a and a second processing unit device 11b, the functionalities of which will be further disclosed below.

The SGW routes and forwards user data packets, whilst also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the DL data path and triggers paging when DL data arrives for the UE. It manages and stores UE contexts, e.g. parameters of the IP bearer service, network internal routing information. It also performs replication of the user traffic in case of lawful interception. The MME is responsible for idle mode UE tracking and paging procedure including retransmissions. It is involved in the bearer activation/deactivation process and is also responsible for choosing the SGW for a UE at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming UEs. The PGW provides connectivity to the UE to external packet data networks 250 by being the point of exit and entry of traffic for the UE. A UE may have simultaneous connectivity with more than one PGW for accessing multiple PDNs. The PGW performs policy enforcement, packet filtering for each user, charging support, lawful Interception and packet screening. Another key role of the PGW is to act as the anchor for mobility between 3GPP and non-3GPP technologies such as WiMAX and 3GPP2 (CDMA 1x and EvDO). The PCRF determines policy rules in real-time with respect to the radio terminals of the system. This may e.g. include aggregating information in real-time to and from the core network and operational support systems etc. of the system so as to support the creation of rules and/or automatically making policy decisions for user radio terminals currently active in the system based on such rules or similar. The PCRF provides the PGW with such rules and/or policies or similar to be used by the acting PGW as a Policy and Charging Enforcement Function (PCEF).

Figure 3:
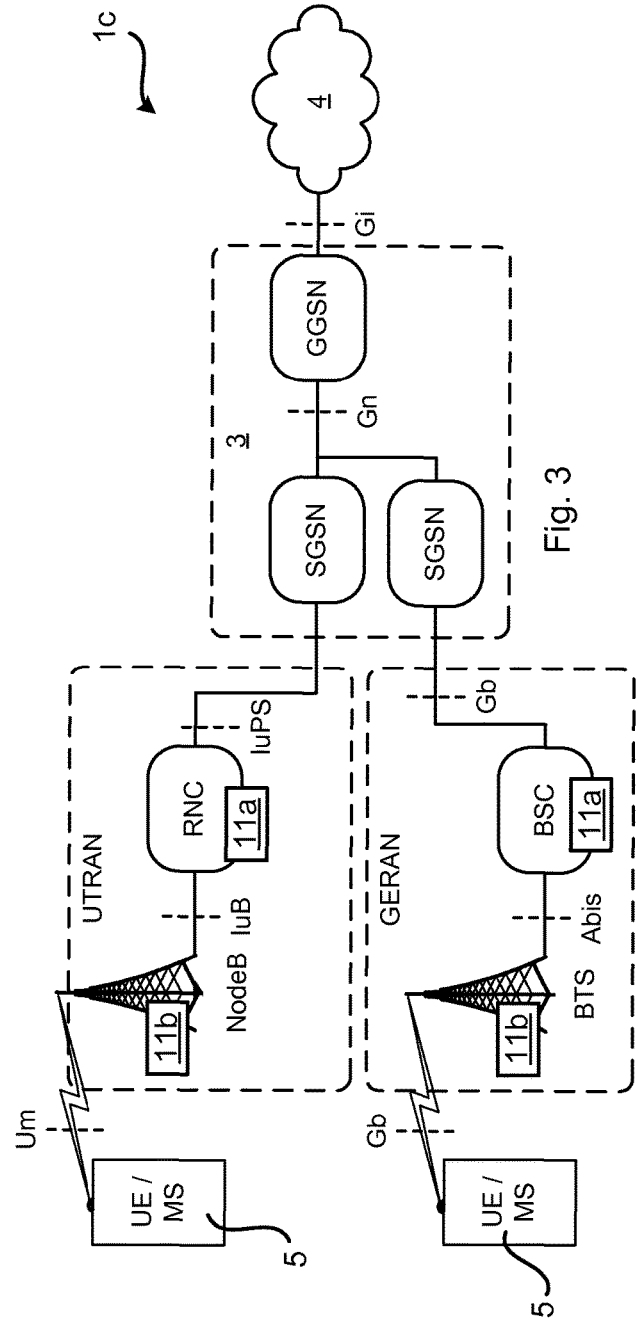

FIG. 3 shows another schematic illustration of an exemplifying wireless communication system 1c comprising a Gateway GPRS Support Node (GGSN) connected to a first Serving GPRS Support Node (SGSN) and a second SGSN. In turn, the first SGSN is connected to a Radio Network Controller (RNC) that is operatively connected to a base station in the form of a NodeB, whereas the second SGSN is operatively connected to a Base Station Controller (BSC) that is connected to a base station in the form of a Base Transceiver Station (BTS). The BSC comprises a first processing unit device 11a and the NodeB comprises a second processing unit device 11b, the functionalities of which will be further disclosed below. The RNC comprises a first processing unit device 11a and the BTS comprises a second processing unit device 11b, the functionalities of which will be further disclosed below.

The GGSN is responsible for the interworking between the GPRS network and an external packet switched data network 4, like the Internet and X.25 networks. The GGSN is the anchor point that enables the mobility of the user terminal in the GPRS/UMTS networks and it may be seen as the GPRS equivalent to the Home Agent in Mobile IP. It maintains routing necessary to tunnel the Protocol Data Units (PDUs) to the SGSN that services a particular Mobile Station (MS). The GGSN converts the GPRS packets coming from the SGSN into the appropriate packet data protocol (PDP) format (e.g., IP or X.25) and sends them out on the corresponding packet data network. In the other direction, PDP addresses of incoming data packets are converted to the GSM address of the destination user. The readdressed packets are sent to the responsible SGSN. The GGSN is responsible for IP address assignment and is the default router for the connected user equipment (UE). The GGSN also performs authentication and charging functions. Other functions include subscriber screening, IP Pool management and address mapping, QoS and PDP context enforcement. The SGSN is responsible for the delivery of data packets from and to the radio terminals such as mobile stations within its geographical service area. Its tasks include packet routing and transfer, mobility management (attach/detach and location management), logical link management, and authentication and charging functions. The location register of the SGSN stores location information (e.g., current cell, current Visitor Location Register (VLR)) and user profiles (e.g., International Mobile Station Identity (IMSI), address(es) used in the packet data network) of all GPRS users registered with this SGSN.

The RNC is a node in the UMTS radio access network (UTRAN) and is responsible for controlling the NodeBs that are operatively connected to it. The RNC carries out radio resource management, some of the mobility management functions and is the point where encryption is done before user data is sent to and from the mobile. The RNC is operatively connected to a Circuit Switched Core Network through Media Gateway (MGW) and to the SGSN in the Packet Switched Core Network. The BSC is a node in the GSM Radio Access Network (GERAN) and is responsible for controlling the BTSs that are connected to it. The BSC carries out radio resource management and some of the mobility management functions.

As may be seen in FIGS. 2 and 3, there are radio terminals such as UEs and/or MSs that communicate with the eNodeB and/or the RNC via a NodeB and/or the BSC via a BTS using an air interface such as LTE-Uu, Um and Gb interface respectively. This makes it possible for the radio terminals to access resources provided by the core network of the systems respectively. A skilled person having the benefit of this disclosure realizes that vast number of well known radio terminals may be used in the various embodiments of the present disclosure. The radio terminal may e.g. be a cell phone device or similar, e.g. such as a Mobile Station (MS) or a User Equipment (UE) or similar, e.g. defined by the standards provided by the 3GPP. Thus, the radio terminal needs no detailed description as such. However, it should be emphasized that the mobile radio terminals may be embedded (e.g. as a card or a circuit arrangement or similar) in and/or attached to various other devices, e.g. such as various laptop computers or tablets or similar or other mobile consumer electronics or similar, or vehicles or boats or air planes or other movable devices, e.g. intended for transport purposes. Indeed, the radio terminal may even be embedded in and/or attached to various semi-stationary devices, e.g. domestic appliances or similar, or consumer electronics such as printers or similar having a semi-stationary mobility character.

The embodiments disclosed herein relate to load sharing in cellular networks. For example, some embodiments addresses distribution of load sharing components from the RRM processing unit in a network node to the baseband processing unit, exploiting a signaling interface between the RRM processing unit and the baseband processing unit. More particularly, the embodiments disclosed herein are based on the understanding that computationally challenging components such as load estimation and prediction (as well as decisions concerning load sharing) may be distributed to the baseband processing unit. The RRM processing unit may be configured to determine a subset of UEs that are suitable for load sharing, and to transfer the UE subset, together with UE configuration and associated measurement, as well as serving and candidate cell load information to the baseband processing unit. In return, the RRM processing unit receives from the baseband processing unit receives load sharing actions as determined by the baseband processing unit, and which may be effectuated via handover procedures.

Particularly, in order to obtain load sharing in cellular networks there is provided a first processing unit device for load sharing, a method performed by the first processing unit device, a computer program comprising code, for example in the form of a computer program product, that when run on the first processing unit device causes first processing unit device to perform the method. There is further provided a second processing unit device for load sharing, a method performed by the second processing unit device, a computer program comprising code, for example in the form of a computer program product, that when run on the second processing unit device causes second processing unit device to perform the method.

Figure 4A:
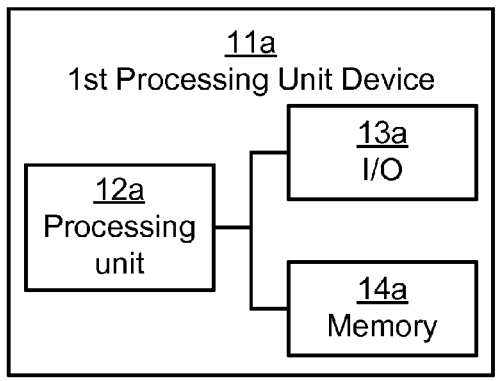
FIG. 4(a) is a schematic diagram showing functional modules of a first processing unit device.

FIG. 4(a) schematically illustrates, in terms of a number of functional modules, the components of a first processing unit device 11a. The first processing unit device 11a may comprise functional blocks, provided by hardware, software, or as a combination thereof, which may enable the first processing unit device 11a to perform the disclosed functionality, method steps, etc., associated with the first processing unit device 11a. According to one embodiment the first processing unit device is a radio resource management, (RRM) unit. The RRM may be part of either a radio network controller (RNC) or a base station controller (BSC).

Figure 4B:
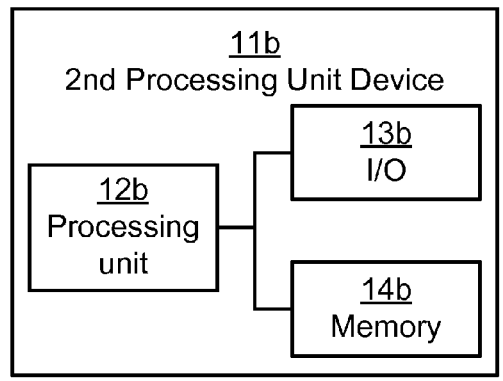
FIG. 4(b) is a schematic diagram showing functional modules of a second processing unit device.

FIG. 4(b) schematically illustrates, in terms of a number of functional modules, the components of a second processing unit device 11b. The second processing unit device 11b may comprise functional blocks, provided by hardware, software, or as a combination thereof, which may enable the second processing unit device 11b to perform the disclosed functionality, method steps, etc., associated with the second processing unit device 11b. According to one embodiment the second processing device is a baseband processing unit.

In FIGS. 4(a) and 4(b) a processing unit 12a, 12b is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 17a, 17b (as in FIG. 6), e.g. in the form of a memory 14a, 14b. Thus the processing unit 12a, 12b is thereby arranged to execute methods as herein disclosed. The memory 14a, 14b may also comprise persistent storage, which, for example, may be any single one or combination of magnetic memory, optical memory, solid state memory or even remotely mounted memory. The first processing unit device 11a and the second processing unit device 11b may further comprise an input/output (I/O) interface 13a, 13b for receiving and providing information to other functional blocks, entities and devices.

Figure 5:
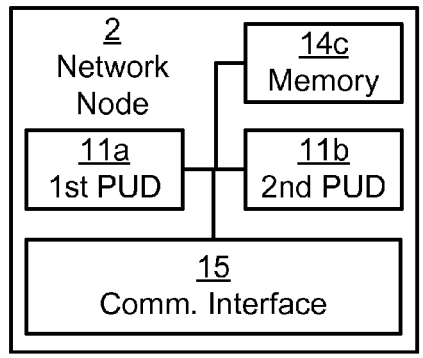
FIG. 5 is a schematic diagram showing functional modules of a network node.

FIG. 5 schematically illustrates, in terms of a number of functional modules, the components of a network node 2. The network node 2 comprises a first processing unit device 11a and a second processing unit device 11b. The first processing unit device 11a and the second processing unit device 11b may be provided as units in a common processing unit functional block 11. The network node 2 further comprises a communications interface 15. The communications interface 15 may comprise one or more transmitters and receivers, comprising analogue and digital components and a suitable number of antennae for radio communication with a UE 4. The common processing unit functional block 11 controls the general operation of the network node 2, e.g. by exchanging information between first processing unit device 11a and the second processing unit device 11b, by sending control signals to the communications interface 15 and by receiving reports from the communications interface 15 of its operation. The memory 14c may also comprise persistent storage, which, for example, may be any single one or combination of magnetic memory, optical memory, solid state memory or even remotely mounted memory. Other components, as well as the related functionality, of the network node 2 are omitted in order not to obscure the concepts presented herein.

Figure 6:
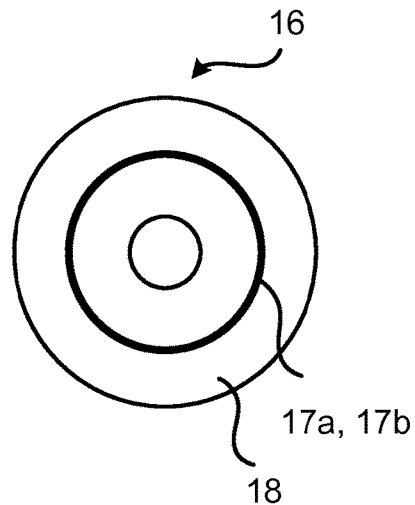
FIG. 6 shows one example of a computer program product comprising computer readable means.
Figure 7:
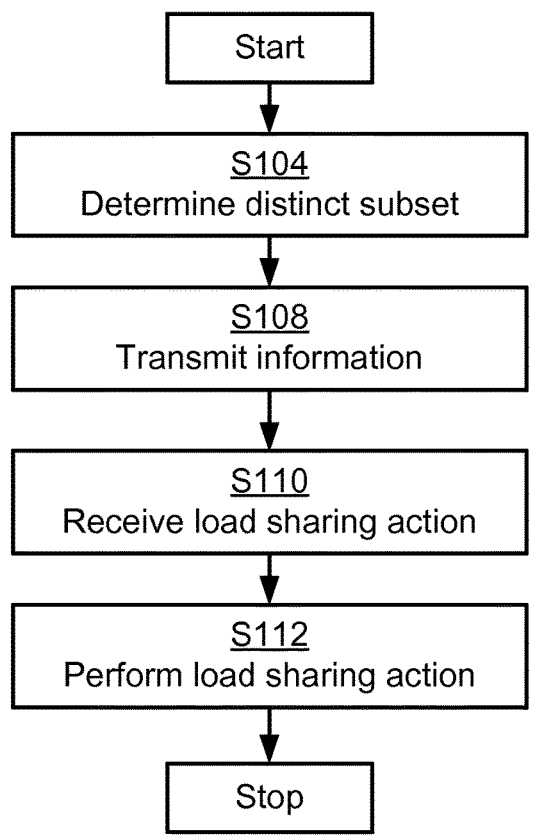
FIGS. 7, 8, 9 and 10 are flowcharts of methods according to embodiments presented herein.
Figure 9:
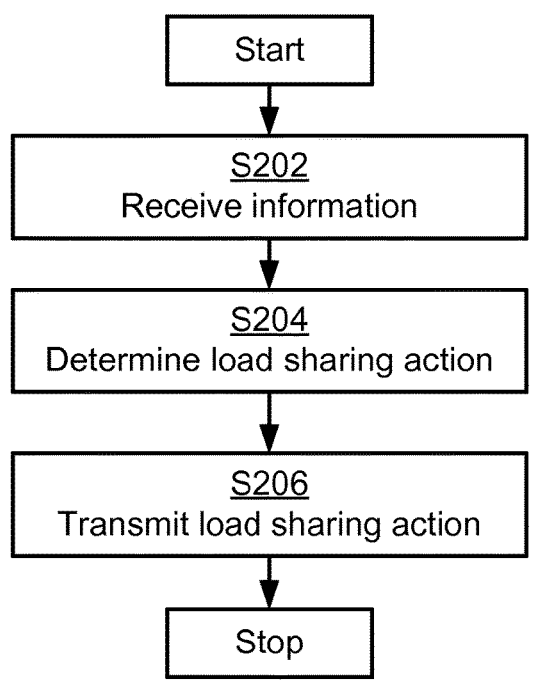
Figures 8, 10:
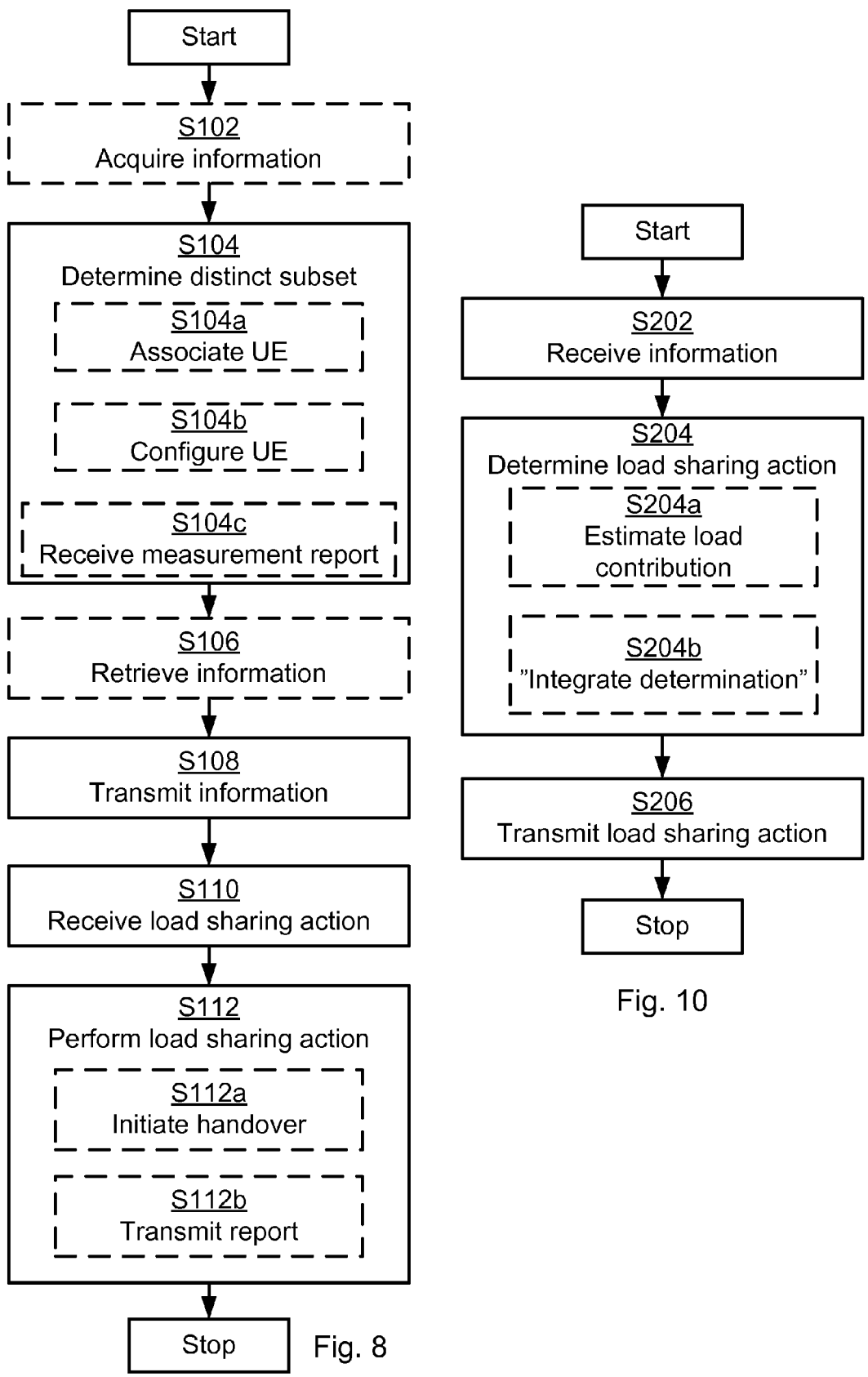
Figure 11:
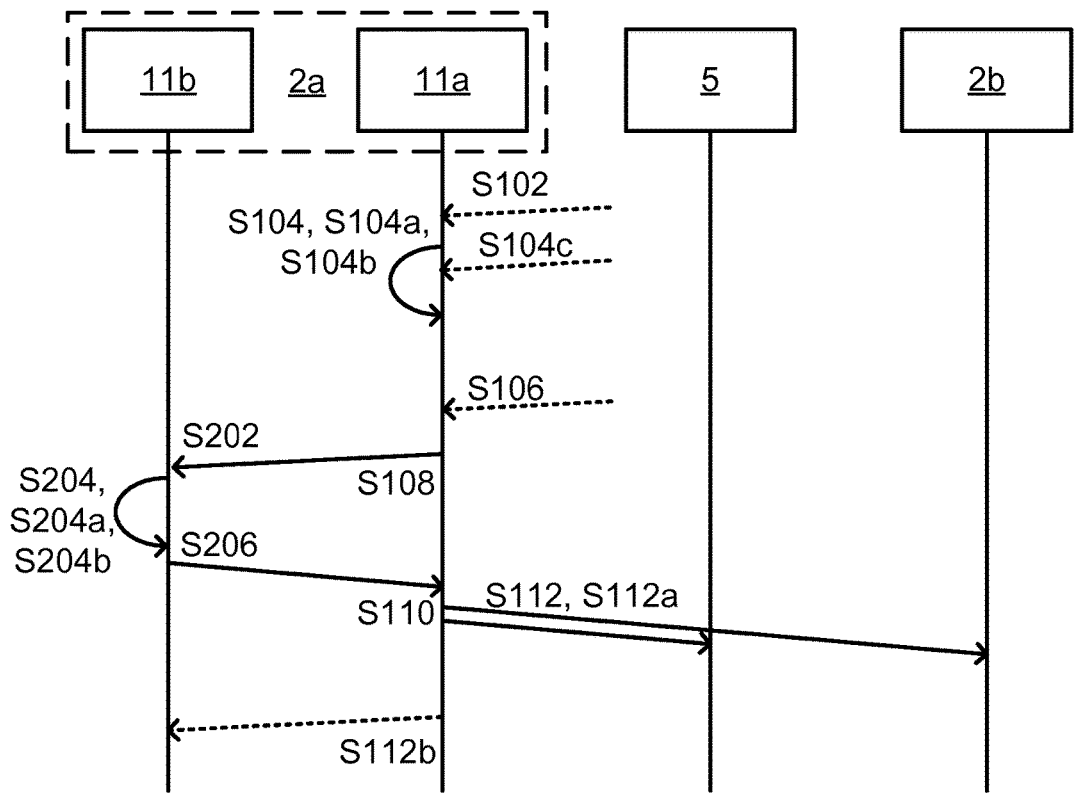
FIG. 11 is a sequence diagram of methods according to embodiments presented herein.

FIGS. 7, 8, 9 and 10 are flow charts illustrating embodiments of methods for load sharing in cellular networks. The methods of FIGS. 7 and 8 are performed by the first processing unit device 11a. The methods of FIGS. 9 and 10 are performed by the second processing unit device 11b. The methods are advantageously provided as computer programs 17a, 17b. FIG. 6 shows one example of a computer program product 16 comprising computer readable means 18. On this computer readable means 18, at least one computer program 17a, 17b may be stored, which at least one computer program 17a, 17b may cause the processing unit 11, 12a, 12b and thereto operatively coupled entities and devices, such as the memory 14a, 14b, the I/O interface 13a, 13b, and the communications interface 15 to execute methods according to embodiments described herein. In the example of FIG. 6, the computer program product 16 is illustrated as an optical disc, such as a CD (compact disc) or a DVD (digital versatile disc) or a Blu-Ray disc. The computer program product 16 may also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the at least one computer program 17a, 17b is here schematically shown as a track on the depicted optical disk, the at least one computer program 17a, 17b may be stored in any way which is suitable for the computer program product 16. The at least one computer program 17a, 17b and/or computer program product 16 thus provides means for performing any steps as herein disclosed.

In general terms, the herein disclosed embodiments are based on load sharing between the first processing unit device 11a and the second processing unit device 11b.

Particularly, the first processing unit device 11a comprises a processing unit 12a. The processing unit 12a is arranged to, in a step S104, determine a distinct subset of user equipment, UE, from a set of UEs. The at least one computer program 17a, 17b and/or computer program product 16 thus provides means for determining the distinct subset. The distinct subset of UEs are candidates for load sharing. The first processing unit device 11a further comprises an input/output (I/O) interface 13a. The I/O interface 13a is therefore arranged to, in a step S108, transmit information identifying the UEs in the distinct subset and information of load of a first cell in which the distinct subset of UEs are served and information of load of a second cell being a candidate cell for serving the distinct subset of UEs to a second processing unit device 11b. The at least one computer program 17a, 17b and/or computer program product 16 thus provides means for transmitting this information.

The second processing unit device 11b therefore comprises an input/output (I/O) interface 13b arranged to receive the information transmitted by the first processing unit device 11a. Particularly, the I/O interface 13b is arranged to receive the information in a step S202. The at least one computer program 17a, 17b and/or computer program product 16 thus provides means for receiving this information. The second processing unit device 11b further comprises a processing unit 12b. The processing unit 12b is arranged to, in a step S204, determine a load sharing action based on evaluating the information received from the first processing unit device 11a. The at least one computer program 17a, 17b and/or computer program product 16 thus provides means for determining the load sharing action. The load sharing action is transmitted by the second processing unit device 11b to the first processing unit device 11a. The I/O interface 13b is therefore arranged to, in a step S206, transmit the determined load sharing action to the first processing unit device 11a. The at least one computer program 17a, 17b and/or computer program product 16 thus provides means for transmitting the determined load sharing action.

The I/O interface 13a of the first processing unit device 11a is therefore arranged to, in a step S110, receive the load sharing action from the second processing unit device 11b. The at least one computer program 17a, 17b and/or computer program product 16 thus provides means for receiving the load sharing action. The load sharing action may then be executed by the first processing unit device 11a. Particularly, the processing unit 12a is arranged to, in a step S112, perform the load sharing action. The at least one computer program 17a, 17b and/or computer program product 16 thus provides means for performing the load sharing action. The first processing unit device 11a and the second processing unit device 11b are thereby arranged for performing load sharing.

Embodiments related to particular details of the above disclosed steps, as well as additional, optional, steps which may be part of the herein methods for load sharing between the first processing unit device 11a and the second processing unit device 11b will now be disclosed in further detail.

UE Subset Selection

In general terms, the UE subset selection allows for a network to determine which individual UEs that at a given point in time are suitable candidates for load sharing towards another cell. There may be different ways to determine the distinct subset of UEs in step S104. Different embodiments related thereto will now be disclosed in detail.

According to one embodiment, first unsuitable UEs, or bearers associated with such UEs, are identified and excluded from the subset of UEs. Thus, determining the distinct subset comprises, as in step S104, comprises, in an optional step S104a as performed by the processing unit 12a, associating the UE with a capacity limit for being served by a candidate network node. The at least one computer program 17a, 17b and/or computer program product 16 may thus provide means for performing this step of associating. Further, the processing unit 12a is according to this embodiment arranged to, in an optional step S104b, configure the UE with a measurement report configuration based on the capacity limit. The at least one computer program 17a, 17b and/or computer program product 16 may thus provide means for performing this step of configuring. A possible categorization if a UE shall be made subject to load sharing at all may be made based on at least one of:

Connection status (RRC_IDLE and/or RRC_CONNECTED)

Mobility Pattern (e.g. user speed, handover history statistics etc.)

QoS configuration for the active bearers (e.g. GBR/non-GBR, conversational)

Service/Application (e.g. VoIP, http-streamed video, background mail sync

The estimated cost of load sharing as e.g. a function of geometry for the UE.

UE Vendor, UE firmware version

UE capabilities (e.g. ICIC, IRC, which 3GPP release it supports, CA etc.)

Settings made by other parts of the LTE system (e.g. DRX settings etc)

Information as listed above may thus be acquired by the first processing unit device 11a prior to determining the distinct subset. According to an embodiment the first processing unit device 11a is thus arranged to, in an optional step S102, acquire at least one of UE capability information, load configuration, load reception of measurements for the UEs. The at least one computer program 17a, 17b and/or computer program product 16 may thus provide means for performing this step of acquiring. The distinct subset may then be determined based on the acquired information.

Further, the processing unit 12a is according to one embodiment arranged to, in an optional step S104c, receive a measurement report of the UE, and based on the measurement report configuration either including the UE in the distinct subset or excluding the UE from the distinct subset. The at least one computer program 17a, 17b and/or computer program product 16 may thus provide means for performing this step of receiving. A further sub-categorization may be made on one or more of the above mentioned bullets such as e.g. UE capabilities. The categorization may be based on the described entities above as current values, historical collected statistics, future predicted values, or any combination thereof.

According to one embodiment the capacity limit is defined by a first capability limit relating to how weak serving capability of the candidate cell can be relative the serving capability of the serving network node of the UE to serve the UE, and wherein the UE is included in the distinct subset. That is, a UE may be associated with a first capability limit value dependent, as in step S104a, the first capability limit value being dependent on e.g. system settings, the capabilities of the UE, the receiver configuration of the UE etc. In general terms, step 104b then concerns the configuration of each UE with a first measurement report triggering configuration taking the first capability limit value into account. In this step, possibly other information such as type (micro/micro/pico/femto/relay etc.), backhaul characteristics etc. may be taken into account. Thereafter, in step S104c, when receiving a measurement report including a triggering candidate cell based on the first measurement report triggering condition by the serving base station, the serving base station will include the UE in a subset suitable for load sharing with the candidate cell.

According to another embodiment the capacity limit is defined by a second capability limit lower than the first capability limit relating to how strong serving capability of the candidate cell can be relative the serving capability of the serving network node of the UE but not serve the UE, and wherein the UE is excluded from the distinct subset. That is, the UE may be associated with a second capability limit value, a second measurement report triggering configuration, and the serving base station will exclude the UE from the subset of UEs suitable for load sharing with the candidate cell that triggered the triggering configuration.

In the following, the subset of UEs suitable for load sharing is said to belong to a load sharing zone (LSZ). In general terms, the LSZ may be defined as the area within which a given UE may be load shared between two specific cells. The occurrence and size of the LSZ may depends on at least one from a group comprising multitude of factors such as radio network deployment and configuration, backhaul inter-connection, which radio access technologies are used, which frequency bands that are used, the UE capabilities, etc.

There may be more than one LSZ. For one LSZ, triggers may be used to understand when UEs move in and out of the LSZ, and UEs in the zone can be associated to different load sharing states, for example an 'Out_Of_LSZ' and an 'Inside_LSZ'. The 'Out_Of_LSZ' and the 'Inside_LSZ' may be separated by at least one intermediate LSZ, 'Intermediate_LSZ'.

In the context of the present disclosure, mainly the coverage aspect is considered. This in turn depends upon factors such as e.g. the capabilities of the UE as defined by 3GPP TS 36.133 regarding non-serving cell detection requirements. These are different for different releases of the specification: 6 dB (Releases 8 and 9), 7.5 dB (Release 10, assuming that the serving cell is almost blanking resources and that the UE is searching for non-serving cells during such almost blanked resources) or 9 dB (Release 11, also assuming that the UE is capable of cancelling non-blanked symbols such as reference signal, synch signals, system information etc. from its serving cell).

In general terms, the embodiments presented next may be based on configuring a UE with event-triggered reporting based on at least radio conditions of the second cell satisfying a first parameterized criterion. The UE may then be associated with a load sharing state based on the event-triggered reporting. In general terms, the embodiments presented next may further be based on configuring the UE with event-triggered reporting based also on radio conditions of the first cell satisfying a second parameterized criterion. The UE may then be associated with the load sharing state also based on the event-triggered reporting based on said radio conditions of the first cell satisfying the second parameterized criterion.

E-UTRAN Intra-Frequency

Figure 12:
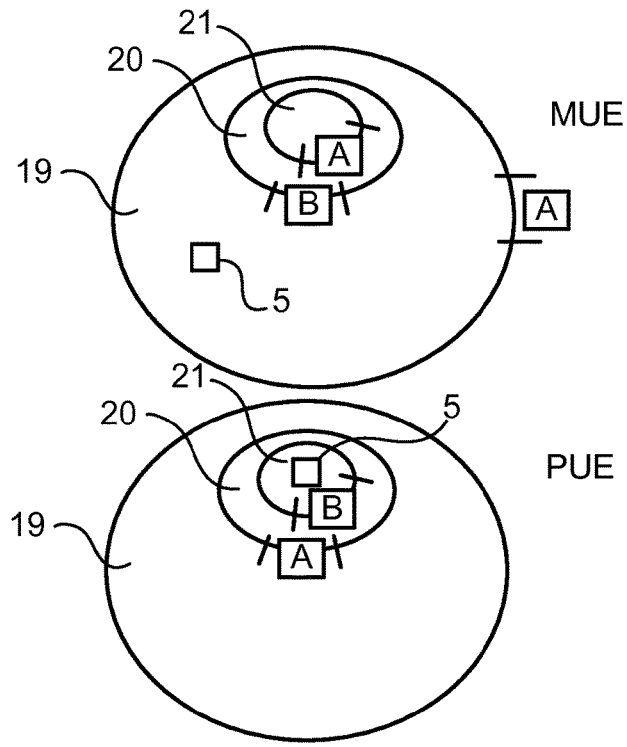
FIG. 12 is schematically illustrates a Load Sharing Zone and events according to an embodiment.

FIG. 12 illustrates a Load Sharing Zone and events configured for E-UTRAN Intra-Frequency operation. In one embodiment, in order to detect other potential target cells on the same E-UTRAN frequency band as the E-UTRAN source cell (i.e. intra-frequency), two A3 events (A and B) are configured where:

A) Will indicate transition out from the LSZ (load sharing zone). This will trigger a "normal" intra frequency mobility handover.

B) Will indicate transition into the LSZ. This will not directly trigger a handover, but rather will allow the load sharing machinery to potentially do so at a later stage.

This embodiment is illustrated in FIG. 12, where any potential offsets and/or hysteresis values with respect to the measurement reporting has been omitted for the sake of clarity. In this embodiment, the CRE configuration of these events may be different depending on the serving cell type:

For a Macro cell the CRE configuration for the above disclosed events A and B involve signalling messages relating to:

A) "Change of best cell" between Pico cell and LSZ and/or "Change of best cell" between one Macro cell and other Macro cells.

B) "Change of best cell including CRE" between Macro and LSZ

Figure 13:
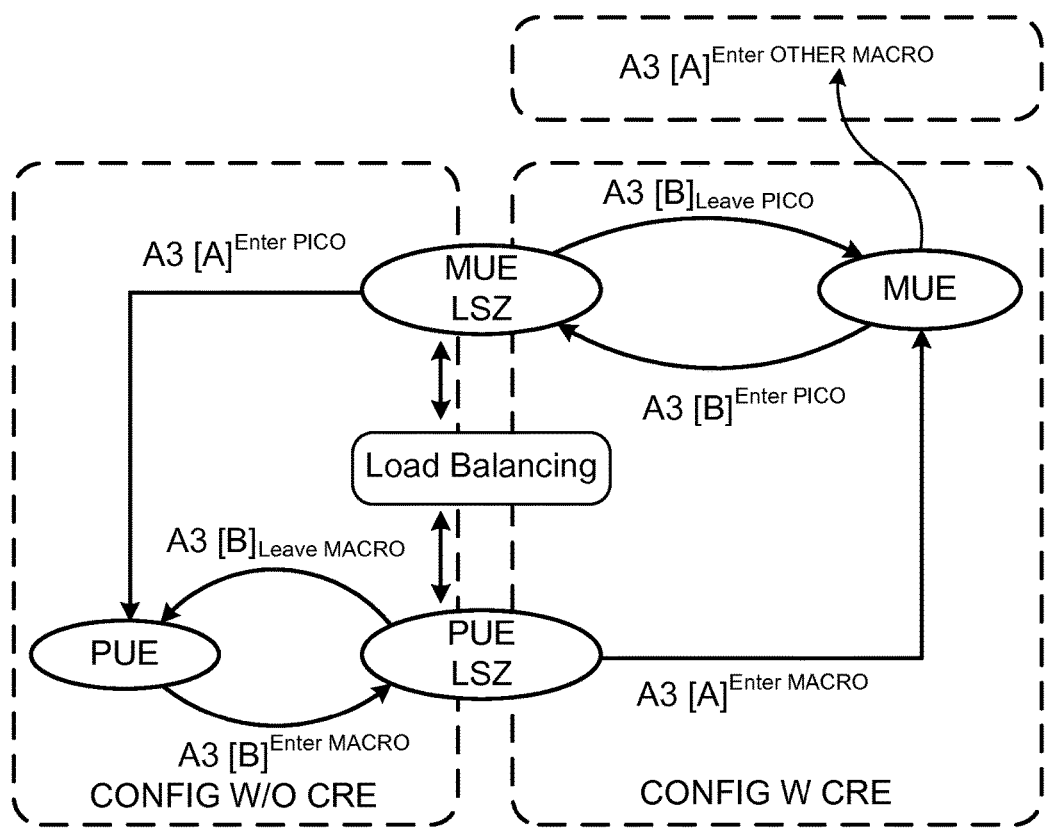
FIG. 13 schematically illustrates a Load Sharing Tracking algorithm according to an embodiment.

For a Pico cell the CRE configuration for the above disclosed events A and B involve signalling messages relating to:

A) "Change of best cell including CRE" between the Macro cell and the LSZ
B) "Change of best cell" between the Pico cell and the LSZ In order to put these measurement events into context a Load Sharing Tracking (LST) algorithm as illustrated in FIG. 13 may be used.

In FIG. 13 MUE denotes that the UE is served by the macro network node and PUE denotes that the UE is served by the pico network node. FIG. 13 will be explained with reference to four illustrative examples:

Assume a first example in which the UE is initially served by the macro cell (i.e., a MUE) The UE enters the LSZ but thereafter leaves the LSZ again back to the macro cell. The UE is at all times served by the macro cell.

Assume a second example in which the UE is initially served by the macro cell (i.e. a MUE). The UE enters the LSZ and is still served by the macro cell. Thereafter it leaves the LSZ when it is handed over (for mobility reasons) to the pico cell (i.e., a PUE). After this, the UE returns in to the LSZ and is still served by the pico cell. Finally leaves the LSZ when it is handed over (for mobility reasons) to the macro cell.

Assume a third example in which the UE is initially served by the pico cell (i.e., a PUE). The UE enters the LSZ but thereafter leaves the LSZ again back to the pico cell. The UE is at all times served by the pico cell.

Assume a fourth example in which the UE is initially served by the pico cell (i.e., a PUE). The UE enters the LSZ and is still served by the pico cell. Thereafter it leaves the LSZ when it is handed over (for mobility reasons) to the macro cell (i.e. a MUE). After this, the UE returns in to the LSZ and is still served by the macro cell. Finally leaves the LSZ when it is handed over (for mobility reasons) to the pico cell.

In another embodiment, the CRE configuration of these events are the same regardless on the serving cell type, e.g. only the A events are configured with CRE. In such an embodiment however, the interpretation of the events will be different depending on the serving cell type according to the following:

For a Macro cell the events A and B may involve the following:
A) transition out from the LSZ will be indicated.
B) transition into the LSZ will be indicated.
For a Pico cell:
A) transition into the LSZ will be indicated.
B) transition out from the LSZ will be indicated.
E-UTRAN Inter-Frequency The procedure in order to detect other potential target cells on other E-UTRAN frequencies than that of the E-UTRAN source cell (i.e. inter-frequency) is similar to that of the intra-frequency case.

In one embodiment, for this purpose, two different events (A and B)—albeit now A being an A3 event whereas B is an A5 event—are configured with signalling as follows:
A) "Change of best cell" between the Macro cell and other Macro cells on the same frequency (i.e. an A3 event).
B) "Change of best cell including CRE" between the Macro cell and the LSZ (i.e. an A5 event)

This procedure may be used for the purpose of activating the small cell as a secondary cell. Also here a Load Sharing Zone tracking algorithm is proposed, albeit less complex than in the intra-frequency case.

RRM Information Signaling to the BB

There may be different ways to transmit information identifying the UEs in the distinct subset, as in step S108, and to receive this information, as in step S202. Different embodiments related thereto will now be disclosed in detail.

According to one embodiment the information is by the first processing unit device 11a transmitted through a communications interface 13a for device external communications. According to one embodiment the information is thus by the second processing unit device 11b received through a communications interface 13b for device external communications. In general terms, the RRM processing unit is terminating X2 (see, 3GPP 36.423), S1, racket interface module (RIM) (see, 3GPP 36.413) and RRC (Radio Resource Control, see 3GPP 36.331331) protocols, which means that the RRM processing unit is configured to retrieve:

RRC measurement reports from served UEs including measurement reports indicating UE subset inclusion/ exclusion, but also including serving and candidate cell reference signal received power (RSRP) and quality (RSRQ)

X2, S1 and RIM signaling from serving cells of neighboring network nodes at the same RAT/frequency, same RAT but different frequency, or different RAT/ frequency (or even different RAT but same frequency), including load information. Such cell load information may be expressed as a fractional value relative a maximum cell capacity, or as an absolute value. The load may reflect only the radio resource utilization, or also consider transport network aspects, hardware aspects, etc.

In case of X2, the load information elements are denoted resource status information, and includes:
Hardware load indication, which may be regarded as a crude measure of the hardware resource utilization, quantized into low, mid, high, or overload,
Transport network layer load indication, which generally describes the transport load situation, quantized into low, mid, high, or overload, and
Radio resource status, which indicates the percentage of scheduled resources with respect to the available resources, and is divided into guaranteed and non-guaranteed bit rate usage.

According to one embodiment the information of load of the first cell and/or said information of load of the second cell is thus received by the first processing unit device 11a from at least one of a radio resource control, RRC, interface, an X2 interface, an S1 interface, a common public radio interface, CPRI, and a racket interface module, RIM.

The UE information may comprise bearer information, such as service targets (guaranteed bitrate, target bitrate, guaranteed latency, etc). This information may have been retrieved from a different network node, such as a core network node or an operations and maintenance node, or determined via inspection of the data packets to/from the UE.

The UE information may comprise cost information associated with candidate cells. This information may for example be based on estimated bitrate obtained from simulation and/or historical throughput measurements. The UE information may further depend on UE capability (e.g., carrier routing system, CRS, cancellation capability), vendor type, firmware version etc.

The RRM processing unit may be configured to transmit subset UE information and source and candidate cell load information to the baseband processing unit, either by forwarding the retrieved information from the RRC, X2, S1, RIM or similar, or by transmitting the information after conversion to alternative formats.

Determination of Load Sharing Actions

As noted above with reference to step S204 the second processing unit 11b is arranged to determine the load sharing action based on evaluating the information received from the first processing unit device 11a. There may be different ways to determine the load sharing action. Different embodiments related thereto will now be disclosed in detail.

Given a UE, bearer information and measurements, the baseband processing unit may estimate the load contribution $L_{s,i}$ to the serving cell load $L_s$ of a UE i, as well as the predicted load contribution $L_{c,i}$ to a specific candidate cell c, with cell load $L_c$.

The serving cell load may be determined by aggregating the load contributions over all UEs and their bearers. Thus:

$$L_{s,i}=L_{s,1}+L_{s,2}+\ldots+L_{s,n}$$

Furthermore, the predicted cell load $L_{c,pred}$ of a candidate cell may be given by $$L_{c,pred}=L_c+L_{c,i}$$

Thus, according to one embodiment determining the load sharing action further comprises estimating, in an optional step S204a as performed by the processing unit 12b of the second processing unit device 11b, a load contribution $L_{s,i}$ to the serving cell load $L_s$ of a particular UE i in the distinct subset and estimating a predicted load contribution $L_{c,i}$ to a candidate cell c, with cell load $L_c$, from the received information. The at least one computer program 17a, 17b and/or computer program product 16 may thus provide means for performing this step of estimating.

With these components, it is possible to consider different load sharing strategies including, but not limited to, at least one of the following:

Load balancing, where one objective is to keep the load approximately equal in all cells. For example, according to one embodiment the load difference cannot be larger than a pre-determined threshold (e.g. configurable via OaM, operations and management), and if so, the load balancing of UEs aims at reducing the difference. Minimum load thresholds per cell that the cell load has to exceed before load balancing is initiated may be considered. Similarly, it may also be considered to use a maximum load threshold over which load sharing UEs are not accepted to become served by the candidate cell, Overload avoidance, where one objective is to avoid overload in all cells by offloading UEs to other cells, for example when the serving cell load has reached a pre-determined (e.g. configurable via OaM) load threshold, and Energy efficiency, where one objective is to abandon resources (if possible) to allow the resources to be disconnected to allow for power saving. For example, according to an embodiment loads of UEs are not shared unless the cell load exceeds a pre-determined threshold (e.g. configurable via OaM).

Since the disclosed load sharing strategy according to one embodiment is implemented in the baseband processing unit, it may be possible to integrate the disclosed load sharing strategy with secondary carrier activations/deactivations for UEs supporting carrier aggregation, and antenna point transmission/reception activation/deactivation for UEs supporting and subject to coordinated transmission and/or reception over one or more antenna points. It is also possible to consider gains and opportunities from MIMO transmission and reception in an integrated fashion. Thus according to one embodiment the step of determining the load sharing action is in an optional step S204b as performed by the processing unit 12b of the second processing unit device 11b, integrated with at least one of information from radio resource management actions performed by the second processing unit 12b, the radio resource management actions comprising at least one of activations/deactivations of more than one carrier for a particular UE, activation/deactivation of coordinated transmission and/or reception on behalf of a particular UE for two or more antenna points, and multiple input multiple output, MIMO, transmissions and/or receptions of a particular UE. The at least one computer program 17a, 17b and/or computer program product 16 may thus provide means for performing this step of integrating.

In some embodiments the load sharing actions are desired actions that may or may not be effectuated by the first processing unit device 11a, see below.

Signaling of Load Sharing Actions

There may be different ways to transmit the determined load sharing action, as in step S206, and to receive this load sharing action, as in step S110. Different embodiments related thereto will now be disclosed in detail.

According to one embodiment the load sharing action is by the second processing unit device 11b transmitted through a communications interface 13b for device external communications. According to one embodiment the load sharing action is thus by the first processing unit device 11a received through a communications interface 13a for device external communications.

The load sharing actions may be sent from a baseband processing unit to a RRM processing unit. The load sharing actions may be a recommendation, but may also be an order to be completed. The load sharing actions indicate UEs and/or their bearers that should be subject to changes of the serving cell, together with an indication of the target cell, possibly also the currently serving cell. That is, according to one embodiment the load sharing action indicates at least one of bearers of the UEs in the distinct subset, the UEs in the distinct subset, the first cell, and the second cell.

According to one embodiment the load sharing action indicates at least two bearers of one UE in the distinct subset. The at least two bearers are provided by at least two network nodes simultaneously serving the one UE. In such a dual-connectivity case, the different bearers associated with one and the same UE may thus be provided by different network nodes. Hence, in the dual-connectivity case there will be several different baseband processing units involved, wherein none of baseband processing units involved will individually have full information of all bearers associated with the UE. In such situations, the anchor node RRM may be configured to make the final decision on the load sharing action, and hence what is reported by the individual baseband units shall be regarded as recommendations.

Not only in the dual-connectivity case, but also in other situation such as e.g. a so-called main-remote scenario, the baseband processing unit and the RRM processing unit may be located in different network entities. This would require the signaling between the processing units to be performed over an external communications interface such as e.g. X2, S1, CPRI or evolved versions thereof, as disclosed above.

Effectuation of the Load Sharing Actions

Upon reception of the load sharing actions by the RRM processing unit from the baseband processing unit, the RRM processing unit may initiate handover to the target cell for each of the UEs listed by the baseband processing unit. When handovers are completed, the baseband processing unit may be informed to update its information accordingly. That is, according to one embodiment the load sharing action relates to a handover procedure to be performed by the first processing unit device 11a. The processing unit 12a of the first processing unit device 11a may therefore be arranged to, in an optional step S112a, initiate handover of each UE in the distinct subset based on the load sharing action. The at least one computer program 17a, 17b and/or computer program product 16 may thus provide means for performing this step of initiating. The I/O interface 13 may then be arranged to, in an optional step S112b, transmit a report to the second processing unit device 11b that handover has been completed. The at least one computer program 17a, 17b and/or computer program product 16 may thus provide means for performing this step of transmitting.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, in UTRAN and GERAN, the RRM processing unit is not localized in the base station but in the radio network controller and in base station controller respectively. This means that the interface between the RRM processing unit and baseband processing unit may be between different physical network nodes. The inventive concept is also applicable to such radio access network architectures. That is, the first cell may be served by a first network node employing a first radio access technology, RAT, and the second cell may be served by a second network node employing a second RAT different from the first RAT.

The invention claimed is:

1. A method for load sharing in a first processing circuit device, the method comprising:
    determining a distinct subset of user equipments (UEs) from a set of UEs, based on associating each UE in the set of UEs with a capacity limit for being served by a candidate network node, the distinct subset of UEs being candidates for load sharing, wherein, for each UE in the set of UEs:
        the capacity limit is defined by a first capability limit relating to how weak serving capability of a candidate cell for serving the distinct subset of UEs can be relative to serving capability of a serving network node of the UE to serve the UE, and wherein the UE is included in the distinct subset of UEs; and
        the capacity limit is defined by a second capability limit, lower than the first capability limit, relating to how strong the serving capability of the candidate cell can be relative to the serving capability of the serving network node of the UE but not serve the UE, and wherein the UE is excluded from the distinct subset of UEs;
    transmitting, to a second processing circuit device, information identifying the UEs in the distinct subset of UEs, information of load of a first cell in which the distinct subset of UEs are served, and information of load of a second cell being the candidate cell for serving the distinct subset of UEs;
    receiving a load sharing action from the second processing circuit device, the load sharing action being based on evaluation of the information transmitted by the first processing circuit device; and
    performing the load sharing action.

2. The method of claim 1:
    further comprising, prior to determining the distinct subset of UEs, acquiring at least one of UE capability information, load configuration, and load reception of measurements for the UEs; wherein the distinct subset of UEs is determined based on the acquired information.

3. The method of claim 1, wherein determining the distinct subset of UEs comprises, for each UE in the set of UEs:
    configuring the UE with a measurement report configuration based on the capacity limit;
    receiving a measurement report of the UE; and
    based on the measurement report configuration, either including the UE in the distinct subset of UEs or excluding the UE from the distinct subset of UEs.

4. The method of claim 1, further comprising retrieving the information of load of the first cell and/or the information of load of the second cell from at least one of: a radio resource control (RRC) interface, an X2 interface, an S1 interface, a common public radio interface (CPRI), and a racket interface module (RIM).

5. The method of claim 1, wherein the load sharing action relates to a handover procedure to be performed by the first processing circuit device, the method further comprising:
    initiating handover of each UE in the distinct subset of UEs based on the load sharing action; and
    transmitting a report to the second processing circuit device that the handover has been completed.

6. The method of claim 1, wherein the information is transmitted and the load sharing action is received through a communications interface for device external communications.

7. A method for load sharing in a second processing circuit device, the method comprising:
    receiving, from a first processing circuit device, information identifying user equipments (UEs) in a distinct subset of UEs from a set of UEs, the distinct subset of UEs being candidates for load sharing, information of load of a first cell in which the distinct subset of UEs are served, and information of load of a second cell being a candidate cell for serving the distinct subset of UEs, the information identifying the UEs in the distinct subset of UEs from the set of UEs being based on a capacity limit for being served by a candidate network node associated with each UE in the set of UEs, wherein, for each UE in the set of UEs:
        the capacity limit is defined by a first capability limit relating to how weak serving capability of a candidate cell can be relative to serving capability of a serving network node of the UE to serve the UE, and wherein the UE is included in the distinct subset of UEs; and
        the capacity limit is defined by a second capability limit, lower than the first capability limit, relating to how strong the serving capability of the candidate cell can be relative to the serving capability of the serving network node of the UE but not serve the UE, and wherein the UE is excluded from the distinct subset of UEs;
    determining a load sharing action based on evaluating the information received from the first processing circuit device; and
    transmitting the determined load sharing action to the first processing circuit device.

8. The method of claim 7, wherein determining the load sharing action comprises estimating a load contribution to a serving cell load of a particular UE in the distinct subset of UEs and estimating a predicted load contribution to the candidate cell from the received information.

9. The method of claim 7, further comprising integrating the determining the load sharing action with information from radio resource management actions performed by the second processing circuit, the radio resource management actions comprising at least one of: activations/deactivations of more than one carrier for a particular UE, activation/deactivation of coordinated transmission and/or reception on behalf of the particular UE for two or more antenna points, and multiple input multiple output (MIMO) transmissions and/or receptions of the particular UE.

10. The method of claim 7, wherein the information is received, and the load sharing action is transmitted, through a communications interface for device external communications.

11. The method of claim 1, wherein the load sharing action relates to a handover procedure to be performed by the first processing circuit device.

12. The method of claim 1, further comprising:
configuring a particular UE with event-triggered reporting based on at least radio conditions of the second cell satisfying a first parameterized criterion; and
associating the particular UE with a load sharing state based on the event-triggered reporting.

13. The method of claim 12, further comprising:
configuring the particular UE with event-triggered reporting based also on the radio conditions of the first cell satisfying a second parameterized criterion; and
associating the particular UE with the load sharing state also based on the event-triggered reporting based on the radio conditions of the first cell satisfying the second parameterized criterion.

14. The method of claim 1, wherein the load sharing action indicates at least one of: bearers of the UEs in the distinct subset of UEs, the UEs in the distinct subset of UEs, the first cell, and the second cell.

15. The method of claim 1, wherein the load sharing action indicates at least two bearers of one UE in the distinct subset of UEs, the at least two bearers being provided by at least two network nodes simultaneously serving the one UE.

16. The method of claim 1, wherein the first cell is served by a first network node employing a first radio access technology (RAT), and the second cell is served by a second network node employing a second RAT different from the first RAT.

17. A first processing circuit device for load sharing, the first processing circuit device comprising:
a processing circuit configured to determine a distinct subset of user equipments (UEs) from a set of UEs, based on associating each UE in the set of UEs with a capacity limit for being served by a candidate network node, the distinct subset of UEs being candidates for load sharing, wherein, for each UE in the set of UEs:
the capacity limit is defined by a first capability limit relating to how weak serving capability of a candidate cell can be relative to serving capability of a serving network node of the UE to serve the UE, and wherein the UE is included in the distinct subset of UEs; and
the capacity limit is defined by a second capability limit, lower than the first capability limit, relating to how strong the serving capability of the candidate cell can be relative to the serving capability of the serving network node of the UE but not serve the UE, and wherein the UE is excluded from the distinct subset of UEs;
an input/output (I/O) interface configured to:
transmit, to a second processing circuit device, information identifying the UEs in the distinct subset of UEs, information of load of a first cell in which the distinct subset of UEs are served, and information of load of a second cell being the candidate cell for serving the distinct subset of UEs;
receive a load sharing action from the second processing circuit device, the load sharing action being based on evaluation of the information transmitted by the first processing circuit device; and
wherein the processing circuit is configured to perform the load sharing action.

18. The first processing circuit device of claim 17, wherein the first processing device is a radio resource management (RRM) unit.

19. The first processing circuit device of claim 18, wherein the RRM unit is part of either a radio network controller (RNC) or a base station controller (BSC).

20. A second processing circuit device for load sharing, the second processing circuit device comprising:
an input/output (I/O) interface configured to receive, from a first processing circuit device, information identifying user equipments (UEs) in a distinct subset of UEs from a set of UEs, the distinct subset of UEs being candidates for load sharing, information of load of a first cell in which the distinct subset of UEs are served, and information of load of a second cell being a candidate cell for serving the distinct subset of UEs, the information identifying UEs in the distinct subset of UEs from the set of UEs being based on a capacity limit for being served by a candidate network node associated with each UE in the set of UEs, wherein, for each UE in the set of UEs:
the capacity limit is defined by a first capability limit relating to how weak serving capability of a candidate cell can be relative to serving capability of a serving network node of the UE to serve the UE, and wherein the UE is included in the distinct subset of UEs; and
the capacity limit is defined by a second capability limit, lower than the first capability limit, relating to how strong the serving capability of the candidate cell can be relative to the serving capability of the serving network node of the UE but not serve the UE, and wherein the UE is excluded from the distinct subset of UEs;
a processing circuit configured to determine a load sharing action based on evaluating the information received from the first processing circuit device; and
wherein the I/O interface is configured to transmit the determined load sharing action to the first processing circuit device.

21. The second processing circuit device of claim 20, wherein the second processing device is a baseband processing circuit.

22. A network node for load sharing, the network node comprising:
a first processing circuit device;
a second processing circuit device;
wherein processing power of the second processing circuit device is higher than processing power of the first processing circuit device;
wherein the first processing circuit device comprises:
a first processing circuit configured to determine a distinct subset of user equipments (UEs) from a set of UEs, based on associating each UE in the set of UEs with a capacity limit for being served by a candidate network node, the distinct subset of UEs being candidates for load sharing, wherein, for each UE in the set of UEs:

the capacity limit is defined by a first capability limit relating to how weak serving capability of a candidate cell can be relative to serving capability of a serving network node of the UE to serve the UE, and wherein the UE is included in the distinct subset of UEs;

the capacity limit is defined by a second capability limit, lower than the first capability limit, relating to how strong the serving capability of the candidate cell can be relative to the serving capability of the serving network node of the UE but not serve the UE, and wherein the UE is excluded from the distinct subset of UEs;

a first input/output (I/O) interface configured to:
transmit, to a second processing circuit device, information identifying the UEs in the distinct subset of UEs, information of load of a first cell in which the distinct subset of UEs are served, and information of load of a second cell being a candidate cell for serving the distinct subset of UEs;
receive a load sharing action from the second processing circuit device, the load sharing action being based on evaluation of the information transmitted by the first processing circuit device; and
wherein the first processing circuit is configured to perform the load sharing action; and wherein the second processing circuit device comprises:
a second input/output (I/O) interface configured to receive, from the first processing circuit device, the information identifying the UEs in the distinct subset of UEs, the information of load of the first cell, and the information of load of the second cell;
a second processing circuit configured to determine the load sharing action based on evaluating the information received from the first processing circuit device; and
wherein the second I/O interface is configured to transmit the determined load sharing action to the first processing circuit device.

23. A computer program product stored in a non-transitory computer readable medium for load sharing, the computer program product comprising software instructions which, when run on a processing circuit of a first processing circuit device, causes the first processing circuit device to:
determine a distinct subset of user equipments (UEs) from a set of UEs, based on associating each UE in the set of UEs with a capacity limit for being served by a candidate network node, the distinct subset of UEs being candidates for load sharing, wherein, for each UE in the set of UEs:
the capacity limit is defined by a first capability limit relating to how weak serving capability of a candidate cell can be relative to serving capability of a serving network node of the UE to serve the UE, and wherein the UE is included in the distinct subset of UEs; and the capacity limit is defined by a second capability limit, lower than the first capability limit, relating to how strong the serving capability of the candidate cell can be relative to the serving capability of the serving network node of the UE but not serve the UE, and wherein the UE is excluded from the distinct subset of UEs;

transmit, to a second processing circuit device, information identifying the UEs in the distinct subset of UEs, information of load of a first cell in which the distinct subset of UEs are served, and information of load of a second cell being a candidate cell for serving the distinct subset of UEs;
receive a load sharing action from the second processing circuit device, the load sharing action being based on evaluation of the information transmitted by the first processing circuit device; and
perform the load sharing action.

24. A computer program product stored in a non-transitory computer readable medium for load sharing, the computer program product comprising software instructions which, when run on a processing circuit of a second processing circuit device, causes the second processing circuit device to:
receive, from a first processing circuit device, information identifying user equipments (UEs) in a distinct subset of UEs from a set of UEs, the distinct subset of UEs being candidates for load sharing, information of load of a first cell in which the distinct subset of UEs are served, and information of load of a second cell being a candidate cell for serving the distinct subset of UEs, the information identifying UEs in a distinct subset of UEs from a set of UEs being based on a capacity limit for being served by a candidate network node associated with each UE in the set of UEs, wherein, for each UE in the set of UEs:
the capacity limit is defined by a first capability limit relating to how weak serving capability of a candidate cell can be relative to serving capability of a serving network node of the UE to serve the UE, and wherein the UE is included in the distinct subset of UEs; and
the capacity limit is defined by a second capability limit, lower than the first capability limit, relating to how strong the serving capability of the candidate cell can be relative to the serving capability of the serving network node of the UE but not serve the UE, and wherein the UE is excluded from the distinct subset of UEs;
determine a load sharing action based on evaluating the information received from the first processing circuit device; and
transmit the determined load sharing action to the first processing circuit device.

* * * * *